US008510851B2

(12) United States Patent
McDade, Sr.

(10) Patent No.: US 8,510,851 B2
(45) Date of Patent: Aug. 13, 2013

(54) METHOD AND APPARATUS FOR ACCESSING CONTENT PROTECTED MEDIA STREAMS

(75) Inventor: Darryn D. McDade, Sr., Livermore, CA (US)

(73) Assignee: STMicroelectronics, Inc., Coppell, TX (US)

( * ) Notice: Subject to any disclaimer, the term of this patent is extended or adjusted under 35 U.S.C. 154(b) by 195 days.

(21) Appl. No.: 13/109,154

(22) Filed: May 17, 2011

(65) Prior Publication Data

US 2012/0159638 A1 Jun. 21, 2012

Related U.S. Application Data

(60) Provisional application No. 61/425,450, filed on Dec. 21, 2010.

(51) Int. Cl.
*G06F 21/00* (2006.01)
(52) U.S. Cl.
USPC ............ 726/26; 726/7; 726/12; 713/153; 713/167; 709/225; 380/28; 705/51
(58) Field of Classification Search
USPC .................................................. 726/12, 26
See application file for complete search history.

(56) References Cited

U.S. PATENT DOCUMENTS

| 7,966,638 | B2 * | 6/2011 | Gossweiler et al. | .......... 725/133 |
|---|---|---|---|---|
| 2004/0054920 | A1 * | 3/2004 | Wilson et al. | ................. 713/200 |
| 2005/0086501 | A1 * | 4/2005 | Woo et al. | ..................... 713/189 |
| 2008/0126801 | A1 * | 5/2008 | Lee et al. | ....................... 713/167 |
| 2008/0216177 | A1 * | 9/2008 | Yokosato et al. | ................ 726/26 |
| 2008/0289044 | A1 * | 11/2008 | Choi | ................................ 726/26 |
| 2009/0113536 | A1 * | 4/2009 | Zhang et al. | .................... 726/12 |
| 2009/0210698 | A1 * | 8/2009 | Candelore | ..................... 713/153 |
| 2010/0333209 | A1 * | 12/2010 | Alve | ................................ 726/26 |

OTHER PUBLICATIONS

Coral Consortium Corporation, Coral Consortium Whitepaper, www.coral-interop.org/main/news/Coral.whitepaper.pdf, Feb. 2006, pp. 1-15.
Coral Consortium Corporation, Coral Consortium Application Note, www.coral-interop.org/main/news/Coral_MSInterop.pdf, Jul. 28, 2006, pp. 1-30.
McSherry, C., FTC Town Hall: Digital Rights Management technologies, Comment: Project No. P094502, www.eff.org/files/filenode/DRM/DRMCOMMENTS_final.pdf, Feb. 9, 2009, p. 10.

* cited by examiner

*Primary Examiner* — Morshed Mehedi
(74) *Attorney, Agent, or Firm* — Leveque IP Law, P.C.

(57) ABSTRACT

A method and apparatus for recovering a content signal from media stream protected by a digital rights management (DRM) system. A content access device includes a network interface configured to receive the protected media stream from a remote content provider via a network and a plurality of distinct DRM components corresponding to DRM systems supported by the content access device. A content extraction unit is operable to select a DRM component of the plurality of DRM components and execute the selected DRM component to recover a content signal from the protected media stream. When a search engine is used to discover available content, a list of references to available content is presented to the user, the presentation being dependent upon whether or not the content is protected by a DRM system supported by the content access device.

13 Claims, 5 Drawing Sheets

METHOD AND APPARATUS FOR ACCESSING CONTENT PROTECTED MEDIA STREAMS

PRIORITY CLAIM

This application claims priority to provisional application Ser. No. 61/425,450 titled "Method of Classifying Content Protection Mechanism for DRM Content Streaming with Search Engine", filed Dec. 21, 2010.

BACKGROUND

Traditionally, a set top box (STB) is a device that connects to an audio and/or video display, such as a television or monitor, and a signal source. The STB receives signals from the signal source and converts the signals into information (content) that can be displayed on the television or monitor or used to generate sound.

STB's are employed in homes, hotels, and private offices among other places. Connection to the signal source may be made using Satellite, Cable, or Internet links (such as IPTV), for example. Additionally, the content may be delivered by digital television broadcast, such as DVB-T in Europe and ATSC in the United States. Some types of STB's convert these "free to air" transmissions into PAL signals (in the case of Europe) and NTSC signals (in the case of the United States) so that a television can render these new higher quality transmissions.

In the case of paid services such as Satellite TV, Cable TV, and paid IPTV (such as Netflix, ZillionTV etc), a proprietary content protection system is employed to prevent content theft and enforce the appropriate digital usage rights provided for by the content owners and service providers. Some of these services use Digital Rights Management (DRM) technology.

Copy protection has been around since the 1970's. The DVD content scramble system (CSS) was the first commercially successful "DRM". Its purpose was to prevent casual DVD copying using a combination of low intensity encryption, a Key Management system and Bus Encryption.

Later generations evolved to include viewing control, which limited the number of views and restricted transfers to secondary devices. Enforcing the license required aspects such as multi-play monitoring, copying control, print control and alteration control.

Digital rights management (DRM) is an access control technology that is used to limit the use of software, music, videos or other digital data. It can be used by copyright holders, publishers, content providers, playback manufacturers and individuals to limit the use of digital content and devices.

The technology generally relies on interaction between the media and the system that plays it. For example, video DVDs usually include a region code. If the region code does not match the player's region code, the DVD player will not allow the disc to be played.

In the USA, the restrictive power of DRM depends on, and is extended, by two legal mechanisms: the Digital Millennium Copyright Act ("DMCA") and End User License Agreements ("EULAs").

DRM involves the user (the entity wishing to render the content), the content to rendered (music, movie, book, etc.) and the user's rights, which are actions the user is permitted perform with the content (for example, access once, access for specified period, copy, transfer to another device, etc).

Common DRM systems include: WM-DRM, Janus (Microsoft), MS PlayReady/Silverlight (Microsoft), Verimatrix, FairPlay (Apple), OMA (Open Mobile Alliance), BD+ (Blue Ray Discs), OpenMG (Sony Proprietary), Marlin (Intertrust) and others. Some DRM systems are hardware based.

Figure 1:
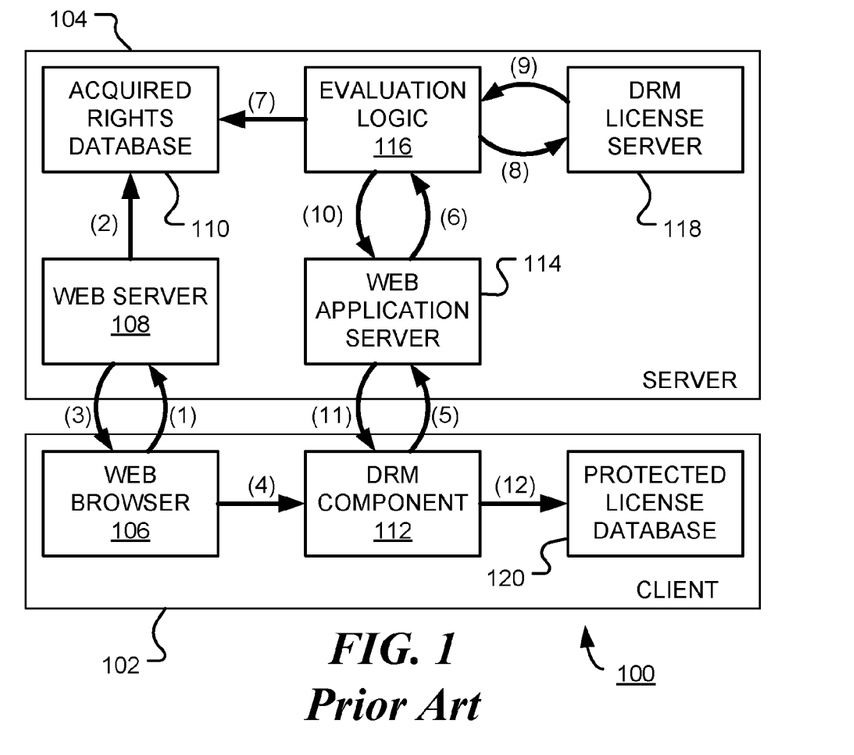
FIG. 1 is a diagrammatic representation of digital rights management system.

An exemplary DRM system is shown in FIG. 1. The DRM system 100 includes a client 102 and a server 104.

The sequence of events by which the client obtains a license to a selected content is as follows:

(1) The client requests content rights, for example by selecting, authorizing or pay for content using a web browser 106 to communicate over a network to a web server 108.
(2) The transaction is recorded by the web server 108 in an Acquired Rights database 110.
(3) The web server 108 returns confirmation of the transaction by passing a token to the client's web browser 106.
(4) The browser triggers the client side of the DRM system 112.
(5) The client DRM system issues a Server Challenge (verify #1) to a web application server 114.
(6) The server parses, and validates the challenge and sends it to the application's Evaluation Logic 116.
(7) The Evaluation Logic 116 validates the request against the transaction record in the Acquired Rights database 110.
(8) The evaluation logic 116 submits a challenge to a DRM License Server 118.
(9) The DRM License Server 118 generates and returns a Custom License.
(10) The Evaluation Logic 116 passes the license back to application server 114.
(11) The Web Application Server 114 returns the license to client's DRM system 112.
(12) The client stores the license in protected license database 120.

Operations performed during a DRM operation may include:
Utilization of proprietary protocols (usually unpublished)
Client Side License Request
License Logic
Server Side License Production
Encrypted Media Transmission
License Persistence Management
License Evaluation
License Revocation These operations are usually confidential and proprietary to each DRM manufacturer, but common functions include the retrieval of cryptographic keys and the subsequent decryption of content. In turn, this requires mechanisms for secure storage of cryptographic keys, secure communication of keys (e.g. secure busses), the use of platform serial numbers, and secure decoding of content and Chip ID requests.

Other operations used include the binding encryption key to the user's machine, the use of Web Based License Servers, in which a server provides an access key, and the use of Watermarks and Broadcast Flags, where data is embedded in content. For example, it is not permitted in the USA for a DVD recorder to record content if the embedded broadcast flag (BF) is set.

Figure 2:
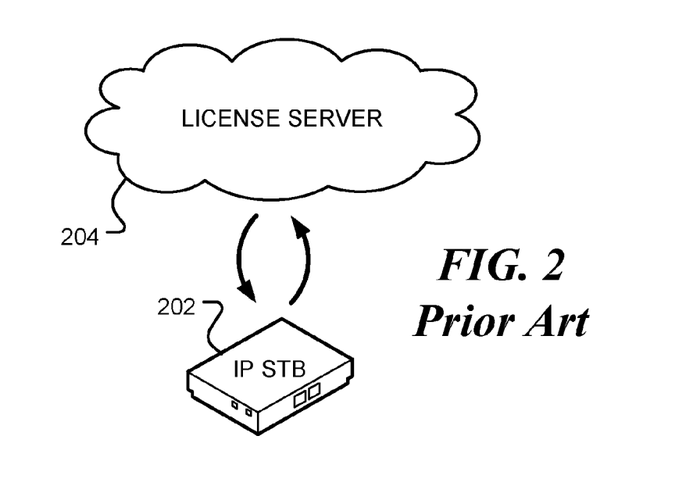
FIG. 2 shows an example of a web based license server.

FIG. 2 shows an example of a web based license server. Referring to FIG. 2, a set top box (STB) 202, such as Internet Protocol (IP) STB, communicates with a remote license server 204 using a single proprietary DRM system to obtain an access key to be used in decoding or decrypting content.

A number of business models are associated with the use of DRM systems. For example, in the case of Satellite and cable content providers, the content provider selects a Conditional Access (CA)/DRM technology and specifies CA/DRM for the STB's in their network. In addition, the content provider owns the STB and supplies the STB to their customer. In the case of IPTV, the content providers select a DRM system to satisfy their content owners and utilize Internet Protocol (IP) streaming technology to deliver the content to the user. The rendering device is a personal computer, STB, or a portable digital device (mobile phone, PDA, etc).

In these business models only one type of CA/DRM system is needed on the STB, however, the STB is limited in the type of content that it can display.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale.

DETAILED DESCRIPTION

Before describing in detail embodiments that are in accordance with the present invention, it should be observed that the embodiments reside primarily in combinations of method steps and apparatus components related to the accessing of content protected media streams. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may comprise one or more conventional processors and unique stored program instructions that control the one or more processors to implement, in conjunction with certain non-processor circuits, some, most, or all of the functions used for accessing content protected media streams described herein. Alternatively, some or all functions could be implemented by a state machine that has no stored program instructions, or in one or more application specific integrated circuits (ASICs) or Field Programmable Gate Arrays (FPGA's), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Audio, visual, textual and other media may be encoded as digital data that may be distributed as a data stream. The data stream typically incorporates additional information for signaling, error correction, identification, etc. The information in the data stream relating the media itself is called the 'content'. A data stream that includes media content is termed a 'mediastream'. The content may be video, such as a television program or a film, or audio information.

A content access device, such as a set top box (STB), is a device that receives a first data stream, from a content provider, and from it extracts a second data stream of extracted data that forms a content signal to be used by a rendering device to display content such as images and/or sounds. The content in the first data stream may be encoded, encrypted or otherwise protected.

Figure 3:
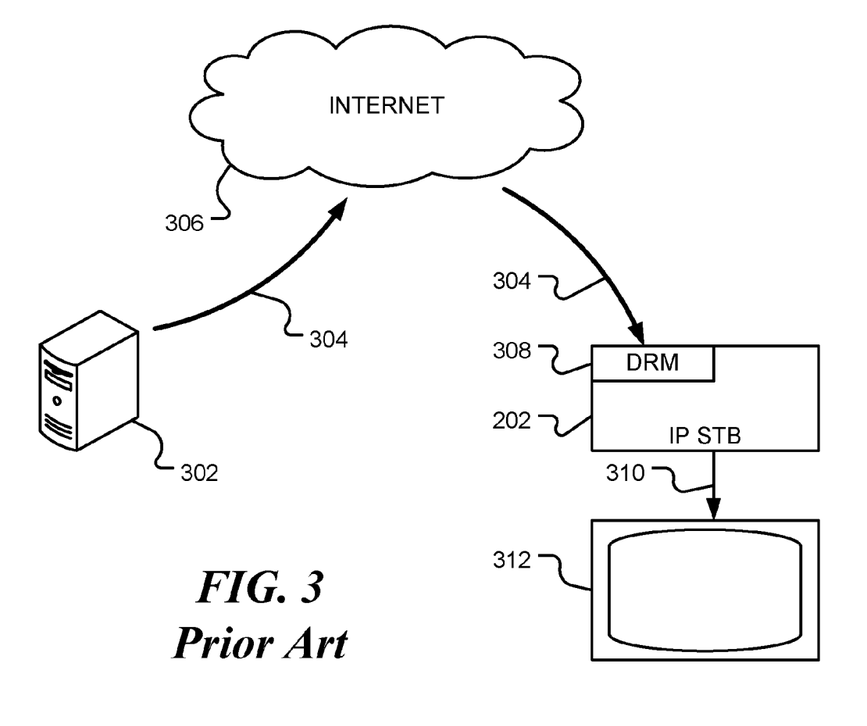
FIG. 3 shows an example of a conventional set top box.

An example is shown in FIG. 3, where a server 302 of a content provider provides a first data stream 304 to a set top box (STB) 202 via the Internet 306. The content, encrypted within the data stream 304, is extracted by the STB 202 using a single, proprietary DRM system 308. The content is provided as a second data stream 310 to a television 312.

A conventional STB is provided to a user by a content provider and may only be used to decrypt and render content supplied by that content provider. In contrast, the present invention relates to a content access device for processing content protected media streams. The content access device is capable of accessing content from multiple content providers. The content access device is also capable of extracting content that is protected by any of a plurality of Digital Rights Management (DRM) systems.

Figure 4:
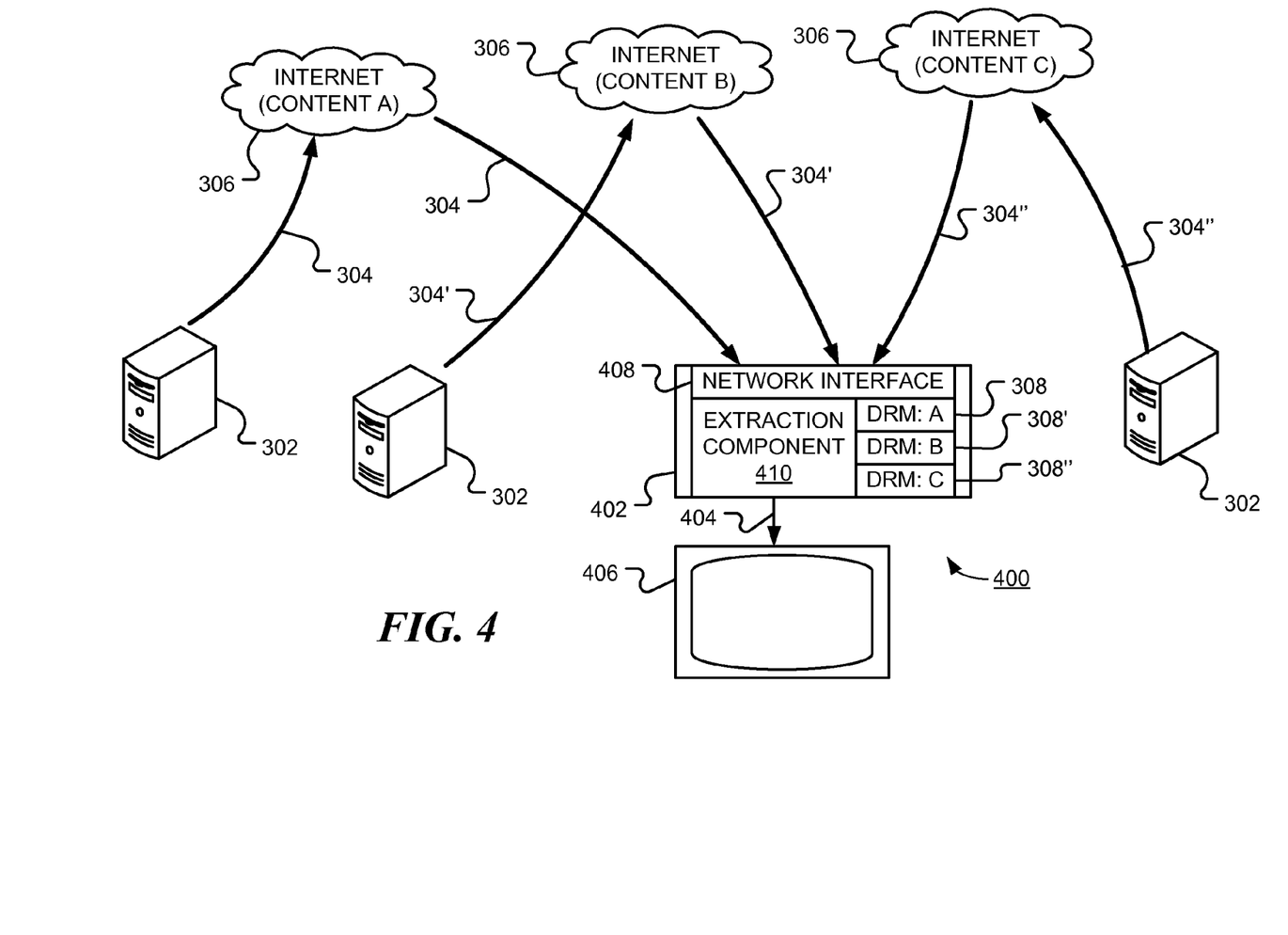
FIG. 4 is a diagrammatic representation of a system for accessing protected media streams in accordance with some embodiments of the present invention.

FIG. 4 is a diagrammatic representation of a system for accessing protected media streams in accordance with some aspects of the present invention. Referring to FIG. 4, the system 400 includes a content access device 402 that is capable of searching, receiving and extracting content from multiple content providers, indicated by servers 302. For example, in FIG. 4, the three content providers 302 provide encrypted or encoded data streams 304, 304' and 304" (carrying content A, B and C, respectively, encoded within the data streams) to the content access device 402 via the Internet 306. The data stream is received at a network interface 408 of the content access device 402. The protected content, which is encrypted in the protected data stream, is extracted by an extraction unit 410. The extracted content is provided as a second data stream, or content signal, 404 to a media presentation device 406, such as a television, visual display unit, rendering engine or audio system.

The media presentation device 406 may serve as part of an interface between the content access device and the user. For example, in one embodiment the media presentation device 406 comprises a touch screen. Additional user interface devices, such a mouse, a keypad or a remote control may also be used to enable the user to interact with the content access device.

In this example, the extraction unit 410 supports three DRM components 308, 308' and 308". The content from each data stream is extracted in accordance with the DRM system associated with it. In this example, content A, encrypted within the data stream 304, is extracted by the extraction unit 410 using DRM A component 308. Content B, encrypted within the data stream 304', is extracted by the extraction unit 410 using DRM B component 308'. Content C, encrypted within the data stream 304", is extracted by the extraction unit 410 using DRM C component 308'".

In one embodiment, the appropriate DRM component to be used to extract the content may be identified and activated automatically by the content access device. For example, the DRM component may be identified dependent upon information embedded within the data stream, or dependent upon other data provided by the content provider.

This enables a single content access device to support multiple DRM systems and thereby expand the pool of content eligible to be extracted and subsequently rendered. This ability to host multiple DRM systems provides the user with greater choice of content.

In general, the content access device is capable of hosting multiple Digital Rights Management (DRM) components. New components may be added to expand the range of content that a user can access.

Since multiple DRM systems are supported, the associated business model differs from current practices for set top boxes (STB's) in that the user (the client or subscriber) may own the content access device 402 and be free to choose a plurality of content providers. Alternatively, the content access device may be leased by the user from a third party, independent of the content providers. In contrast, currently STB are owned by the content provider and leased to the user.

In one embodiment, the media presentation device or rendering engine 406 is integrated with the content access device 402. For example, the content access device 402 may be a data-enabled mobile telephone capable of rendering content on the display screen of the telephone.

Figure 5:
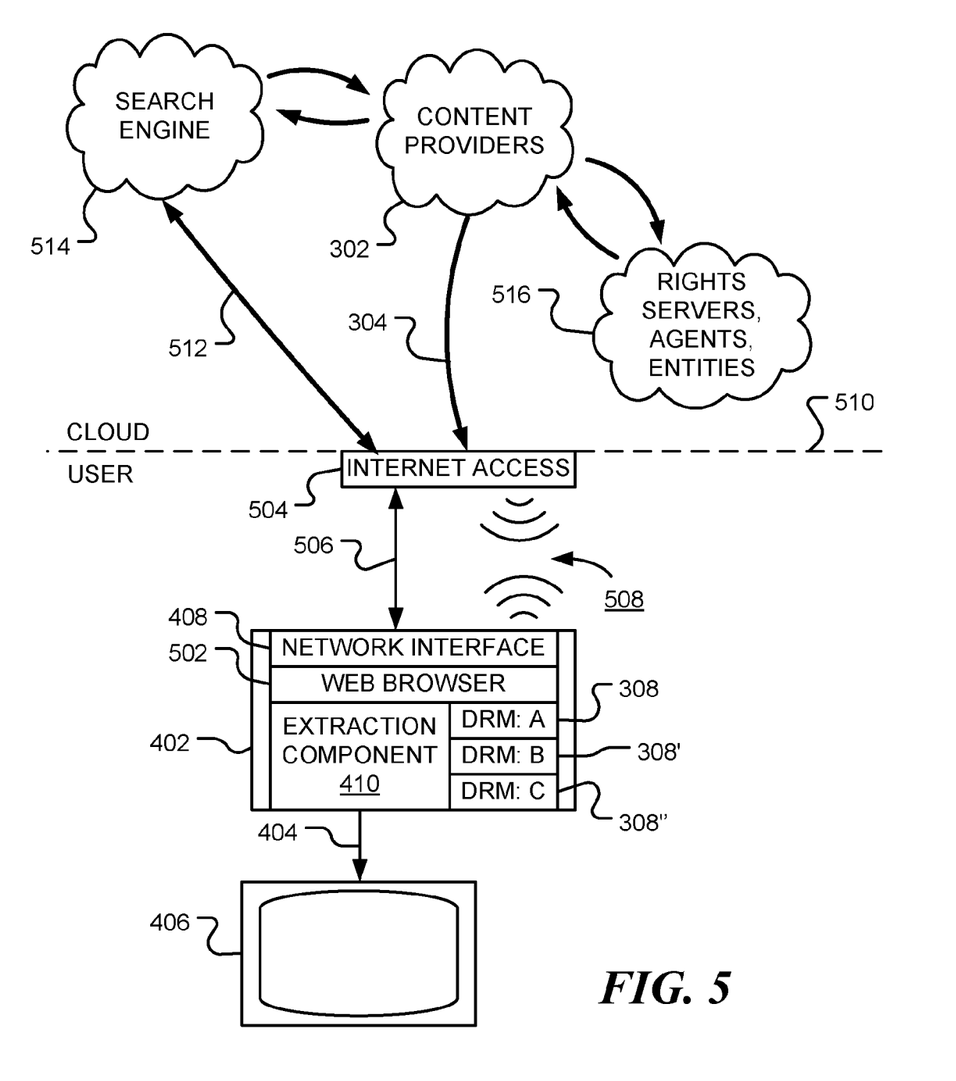
FIG. 5 is a diagrammatic representation of a content access device that supports interaction with a search engine in accordance with some embodiments of the invention.

FIG. 5 is a diagrammatic representation of a further embodiment, in which the content access device 402 supports a content search engine. Referring to FIG. 5, the content access device 402 is linked to an Internet access port 504 via the network interface and a wired communication link 506 or a wireless communication link 508. In the figure, the region of the system above the line 510 and designated as the 'CLOUD' is remote from the user and is accessed via the Internet access port 504.

The content access device 402 supports a web browser 502 that enables a user to search the Internet for content by sending queries along path 512 to a search engine 514. In turn, the search engine 514 may query content providers 302 to discover available content. The search engine reports results back along path 512 to the web browser.

The user may then request content to be accessed from the content providers 302 via path 304. The content providers then verify the user's rights using rights servers 516 and, if the rights are verified, provide the content to the user via path 304.

If the user does not have rights to the content, the transaction action is unsuccessful, and resources are used unnecessarily.

In accordance with an embodiment of the invention, the content access device 402 maintains a list or catalog of the DRM systems supported by the content access device. This catalog is supplied to the search engine 514. This enables the search engine to match the DRM systems of available content with the DRM systems supported by the content access device and only results that are compatible with the content access device are returned to the content access device 402.

In accordance with a further embodiment of the invention, the search engine 514 returns all results of the query, together with the DRM requirements, and the content access device 402 sorts the results dependent upon the available DRM components. For example, the user may select to show only results that match available DRM components. Alternatively, the results displayed to the user may be formatted according to whether DRM components are available or not.

Thus, the content access device is configured to determine if the DRM system associated with any particular content is supported. The content access device can interact with a search engine to either (1) instruct the search engine to only search for content that can be rendered, or (2) filter the results of a search to only display content that can be rendered to the user. Both of these approaches may be implemented by the content access device building a catalog of supported DRM systems.

The code snipped below illustrates how a simple DRM catalog may be created in the content access device. In this example a flag, denoted by the variable is_supported, is set for all DRMs supported.

```
typedef struct DRM
{
    // DRM_Function is a pointer to perform DRM operations,
    // is_supported determines if this DRM is available
    int (* DRM_Function)( ), is_supported;
} DRM;
int                                    // 3 chosen for just for illustration
MAX_DRMS_SUPPORTED=3;
int main (int argc, int *argv[ ])
{
    DRM drm_catalog[3];        // Populated with pointers to the DRMs
                               // supported on this rendering engine
    DRM_TYPE=read_IP_STREAM    // reads DRM for the
    type (IP_STREAM);          //content in IP_STREAM
    for (int i=0; i<MAX_DRMS_SUPPORTED; i++)
    {
        if (DRM_TYPE==drm_catalog[i].is_supported)
        {                      // execute this particular DRM for this particular
                               // content to render it
            drm_catalog[i].DRM_Function( );
        }
        else continue;         // try next DRM or quit if we have tried
                               //all known DRMs
    }
    return 0;
}
```

Figure 6:
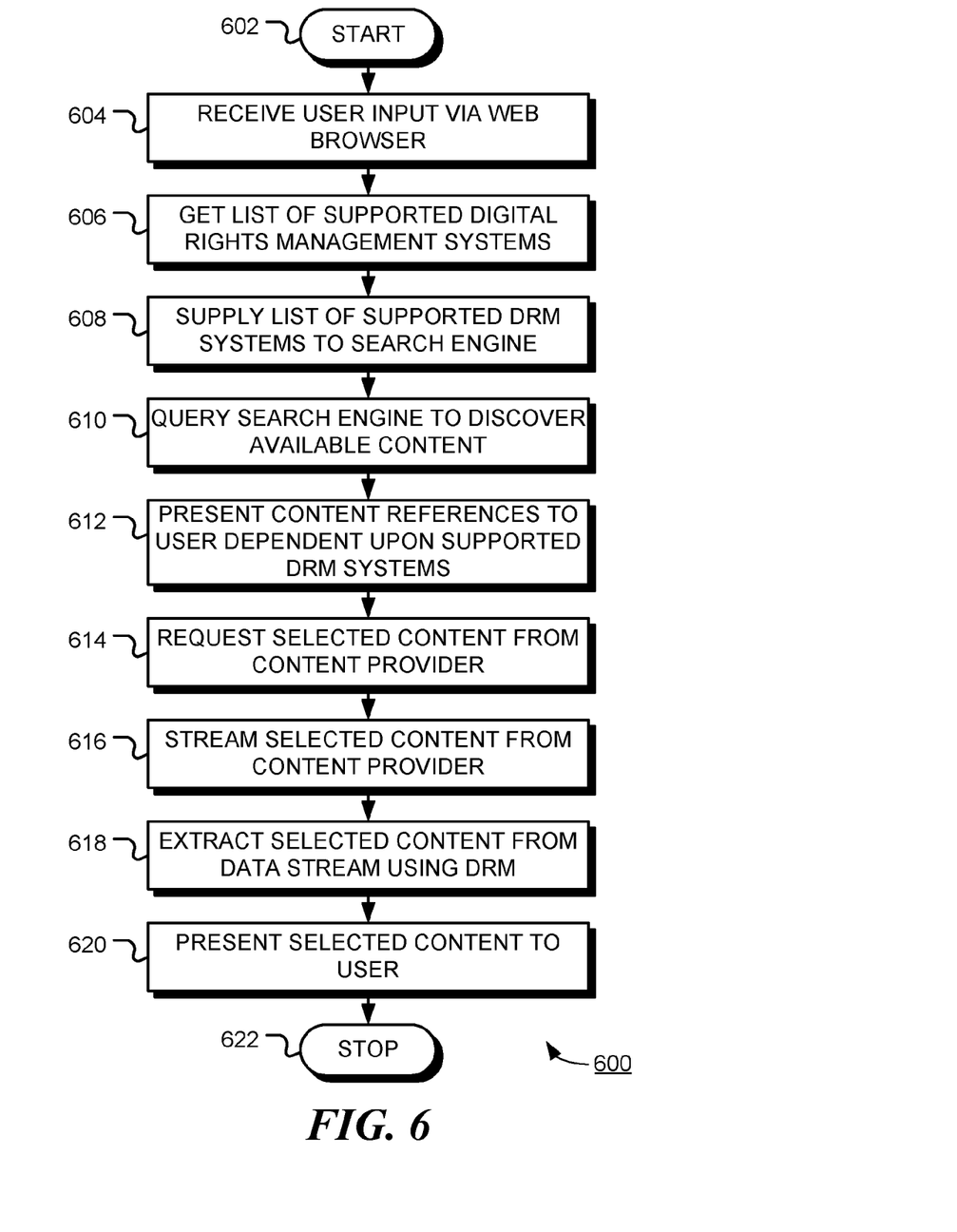
FIG. 6 is a flow chart of a method for accessing protected content in accordance with some embodiments of the present invention.

FIG. 6 is a flow chart 600 of a method for accessing protected content in content access device that supports a plurality of DRM systems. Following start block 602 in FIG. 6, the content access device receives user input via a web browser or other user interface at block 604. At block 606 the device gets a list or catalog of DRM systems that are supported by the device. If this list does not exist, the list maybe created, as described above. In one embodiment, the content access device supplies a copy of the list to a search engine at block 608. In a further embodiment, the list is maintained in the content access device. At block 610, the content access device queries a search engine, dependent upon the user input, to discover available content. The search engine responds with a list of references to the available content. At block 612, the content access devices presents the list of references to the available content to the user, dependent upon whether the content is protected by a DRM system supported by the content access device.

The provision of a catalog of supported DRM systems to the search engine enables the search engine to determine which content is protected by a DRM system supported by the content access device.

In one embodiment, the list of references of available content is filtered to remove references to content that is protected by a DRM system that is not supported by the content access device.

In a further embodiment, the list of references to available content presented to the user is formatted to distinguish between content that is protected by a DRM system that is supported by the content access device and content that is protected by a DRM system that is not supported by the content access device. For example, non-supported content may be marked or shown in a different font or color, or the list may be ordered to show content with supported DRM systems first.

At block 614, the content access device requests selected content from a content provider in accordance with a content reference selected by the user. At block 616, the content access device receives a data stream carrying the content from the content provider. At block 618 the selected content is extracted from the data stream using a DRM system of the plurality of DRM systems. Finally, at block 620, the extracted content is presented to the user. In this manner, the content access device has enabled a user to select content efficiently and to access the selected content.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A content access device for searching for remote content and retrieving media stream protected by a digital rights management (DRM) system, the content access device comprising:
a network interface configured to receive the protected media stream from a remote content provider via a network;
a plurality of distinct DRM components corresponding to a plurality of DRM systems supported by the content access device; and
a content extraction unit operable to select a DRM component of the plurality of DRM components and execute the selected DRM component to recover the content signal from the protected media stream,
wherein select the DRM component dependent upon information carried in the protected media stream;
wherein the content access device is operable to:
query a search engine for available content via the network;
receive, from the search engine, a plurality of content references that match the query, from the plurality of content references, remove content references relating to content protected by a DRM system that is not supported by the content access device to obtain one or more content references that are compatible with the supported DRM systems;
present content references of the one or more content references that are compatible with the supported DRM systems, and
in response to selection of a content reference of the presented one or more content references, request content associated with the selected content reference from the remote content provider.

2. A content access device in accordance with claim 1, further comprising a media presentation device operable to receive the content signal and render content in accordance with the content signal.

3. A content access device in accordance with claim 1, wherein the network comprises the Internet and wherein the content access device further comprises a web browser operable to query the search engine via the Internet.

4. A content access device for searching for remote content and retrieving a media stream protected by a digital rights management (DRM) system, the content access device comprising:
a network interface configured to receive the protected media stream from a remote content provider via a network;
a plurality of distinct DRM components corresponding to a plurality of DRM systems supported by the content access device; and
a content extraction unit operable to select a DRM component of the plurality of DRM components and execute the selected DRM component to recover the content signal from the protected media stream,
where the content extraction unit is operable to select a DRM component of the plurality of DRM components dependent upon information carried in the protected media stream;
wherein the content access device is configured to:
provide a list of supported DRM systems to a search engine,
receive, from the search engine, a plurality of content references that match the query and are compatible with the supported DRM systems,
wherein the content access device is operable to filter results returned from the search engine to remove results relating to content protected by a DRM system that is not supported by the content access device;
present plurality of content references, and
in response to selection of a content reference of the plurality of content references, request content associated with the selected content reference from the remote content provider.

5. A content access device in accordance with claim 4, further comprising a media presentation device operable to receive the content signal and render content in accordance with the content signal.

6. A content access device in accordance with claim 4, wherein the network comprises the Internet and wherein the content access device further comprises a web browser operable to query the search engine via the Internet.

7. A method for a content access device that supports a plurality of DRM systems to access protected content in a media stream, the method comprising:
receiving user input via a user interface;
querying a search engine dependent upon the user input to discover available content;
presenting a list of references to available content to the user, dependent upon whether the content is protected by a DRM system supported by the content access device;
wherein selecting the DRM component dependent upon information carried in the protected media stream;
providing a catalog of supported DRM systems to the search engine to enable the search engine to determine if content is protected by a DRM system supported by the content access device;
filtering the list of references of available content to remove references to content that is protected by a DRM system that is not supported by the content access device; and
formatting the list of references to available content presented to the user so as to distinguish between content that is protected by a DRM system that is supported by the content access device and content that is protected by a DRM system that is not supported by the content access device.

8. A method in accordance with claim 7, further comprising:
selecting a content reference, from the list of references to available content presented to the user, dependent upon user input;
requesting the selected content from a content provider in accordance with the reference to the selected content; and
receiving a data stream carrying the selected content from the content provider; and
extracting the selected content from the data stream using a DRM system of the plurality of DRM systems.

9. A method in accordance with claim 8, wherein extracting the selected content from the data stream using a DRM system of the plurality of DRM systems comprises interacting with the content provider over a network.

10. A method in accordance with claim 8, further comprising presenting the selected content to the user.

11. A method in accordance with claim 7, wherein the user interface comprises a web browser.

12. non-transitory computer readable medium containing program instructions that, when executed on a programmable electronic device, provide a user with access to protected content in a data stream by enabling the device to:
support a plurality of DRM systems;
receive user input;
query a search engine dependent upon the user input to discover available content;
present a list of references to available content to the user, dependent upon whether the content is protected by a supported DRM system;
wherein select the DRM component dependent upon information carried in the protected media stream;
provide a catalog of supported DRM systems to the search engine to enable the search engine to determine if content is protected by a DRM system supported by the content access device;
filter the list of references of available content to remove references to content that is protected by a DRM system that is not supported by the content access device; and
format the list of references to available content presented to the user so as to distinguish between content that is protected by a DRM system that is supported by the content access device and content that is protected by a DRM system that is not supported by the content access device.

13. A non-transitory computer readable medium in accordance with claim 12, wherein the program instructions further enable the device to:
select a content reference from the list of references to available content presented to the user dependent upon user input;
request the selected content from a content provider in accordance with the content reference; and
receive a data stream carrying the content from the content provider; and
extract the selected content from the data stream using a DRM system of the plurality of DRM systems.

* * * * *